United States Patent [19]

Stanclift

[11] Patent Number: 5,673,517
[45] Date of Patent: Oct. 7, 1997

[54] MODULAR THRESHOLD SYSTEM

[76] Inventor: James R. Stanclift, 744 Creekland Cir., San Jose, Calif. 95133

[21] Appl. No.: 503,754

[22] Filed: Jul. 18, 1995

[51] Int. Cl.⁶ .................................................. E06B 1/70
[52] U.S. Cl. .......................... 49/468; 49/467; 403/353; 403/381
[58] Field of Search ................ 49/467, 468, 505; 52/211, 213, 217; 403/393, 353, 381

[56] References Cited

U.S. PATENT DOCUMENTS

| | | | |
|---|---|---|---|
| 1,910,260 | 5/1933 | Reher | 49/467 |
| 1,945,859 | 2/1934 | Katz | 49/467 |
| 2,089,380 | 8/1937 | Kammerer | 49/468 |
| 2,273,877 | 2/1942 | Kammerer | 49/467 X |
| 2,856,651 | 10/1958 | Hobbs | 49/468 |
| 3,402,512 | 9/1968 | Peterson | 49/468 |
| 4,224,766 | 9/1980 | Procton | 49/468 |
| 5,010,690 | 4/1991 | Geoffrey | 49/468 |

*Primary Examiner*—Kenneth J. Dorner
*Assistant Examiner*—Jerry Redman
*Attorney, Agent, or Firm*—The Kline Law Firm

[57] ABSTRACT

A modular threshold system that includes multiple components that are joined together to form various threshold configurations. Each component includes an irregularly shaped channel adapted to receive a conforming projection on a second component. The channel and the projections are shaped so as to allow the components to be installed serially, while providing a secure joint between the components.

1 Claim, 23 Drawing Sheets

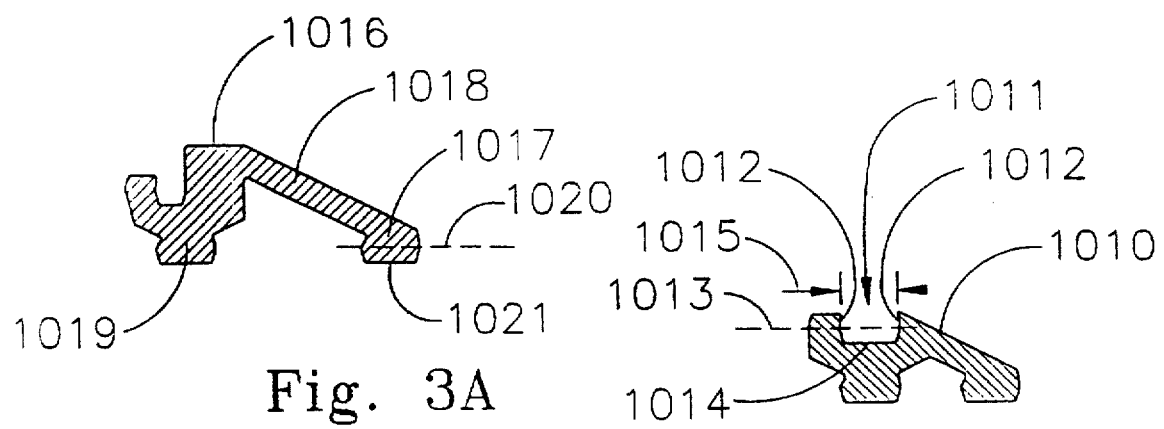
Fig. 3A
Fig. 3B
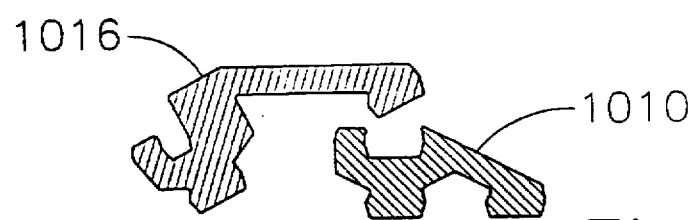
Fig. 3C
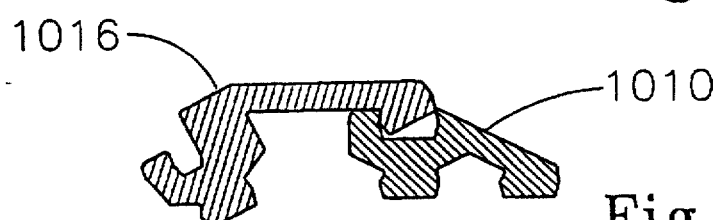
Fig. 3D
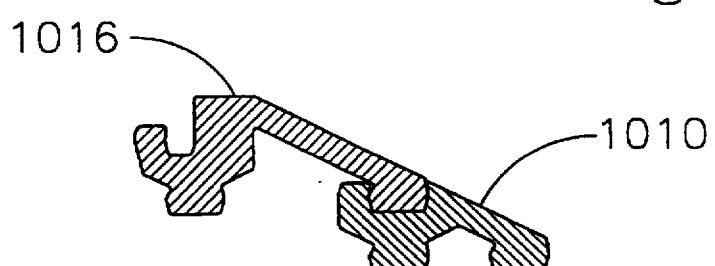
Fig. 3E

28

28

38

38

MODULAR THRESHOLD SYSTEM

FIELD OF THE INVENTION

The present invention relates generally to construction products, and more particularly is a system of components that enables the user to configure for, and install thresholds in, any doorway conformation.

BACKGROUND OF THE INVENTION

In any building structure with a door designed to keep out the elements or to allow occupants passage with security, some means must be provided for sealing the space beneath the door. This is one of the purposes of a threshold. Because of the many variations possible in construction, thresholds that are configurable provide the builder with an advantage over those that are designed for a single application.

Because of the vast number of door configurations possible, manufacturers must provide, and builders need to stock, a great many thresholds to assure that each door configuration could be supplied with a proper threshold. Devices that reduce the number of thresholds required to accommodate various doors are therefore of a great service to builders. Such devices have therefore received a good deal of attention over the years.

The prior art includes many devices directed to thresholds that can adapt to differing door requirements. One such device is the "Adjustable Threshold", by Johansen, U.S. Pat. No. 3,475,866. This device features a midsection that can be raised or lowered depending on the amount of clearance beneath the door to be sealed.

One means of allowing thresholds to adapt to multiple situations is to form the threshold from multiple sections. This allows the user some flexibility in installing the sections as required by the application. A device demonstrating this feature is the "Sectional Doorsill or the Like", by Reher, U.S. Pat. No. 1,910,260.

A very early reference that extends the concept of sectional construction even further is the "Door Saddle" by Coco, U.S. Pat. No. 1,890,672. This patent discloses the use of various components joined together to adapt to various door requirements.

One shortcoming of these prior art devices is that there is no provision for easily and securely joining the components. Since these thresholds are generally formed from aluminum or brass, loose joints can be very noisy, and give rise to open spaces between the threshold and the floor surface.

Some of the prior art devices, such as Reher and Coco, provide dovetail interlocks to more securely join the sections of the threshold. A drawback of this approach is that the threshold must either be installed completely assembled, or the door must have sufficient longitudinal clearance to allow successive sections to be slid together. The former situation makes working with the threshold difficult, while the latter situation would rarely occur in a construction situation.

OBJECTS, SUMMARY, AND ADVANTAGES OF THE INVENTION

It is therefore an object of the present invention to provide a modular threshold system that can be adapted to satisfy the requirements of all common door installations.

It is a further object of the present invention to provide the components of the threshold with means to easily and securely connect the components.

It is a still further object of the present invention to provide a system that allows builders to stock a limited number of components, and yet be able to address all installation circumstances.

In summary, the present invention is a modular threshold system. The system includes multiple components that are joined together to form various threshold configurations. Each component includes an irregularly shaped channel adapted to receive a conforming projection on a second component. The channel and the projections are shaped so as to allow the components to be installed serially, while providing a secure joint between the components.

An advantage of the present invention is that all common door installations can be serviced by a single threshold system.

A further advantage of the present invention is that the builder does not need to stock a large plurality of thresholds.

A still further advantage of the present invention is that use of the modular threshold system reduces the cost of construction of a building.

These and other objects and advantages of the present invention will become apparent to those skilled in the art in view of the description of the best presently known mode of carrying out the invention as described herein and as illustrated in the drawings.

BRIEF DESCRIPTION OF THE DRAWINGS

FIGS. 3A–E depict the assembly of a horizontal top joint.

BEST MODE OF CARRYING OUT THE INVENTION

The present invention is a modular threshold system comprising a plurality of modular components that can be assembled to form all threshold configurations common in the construction industry.

Figure 2:
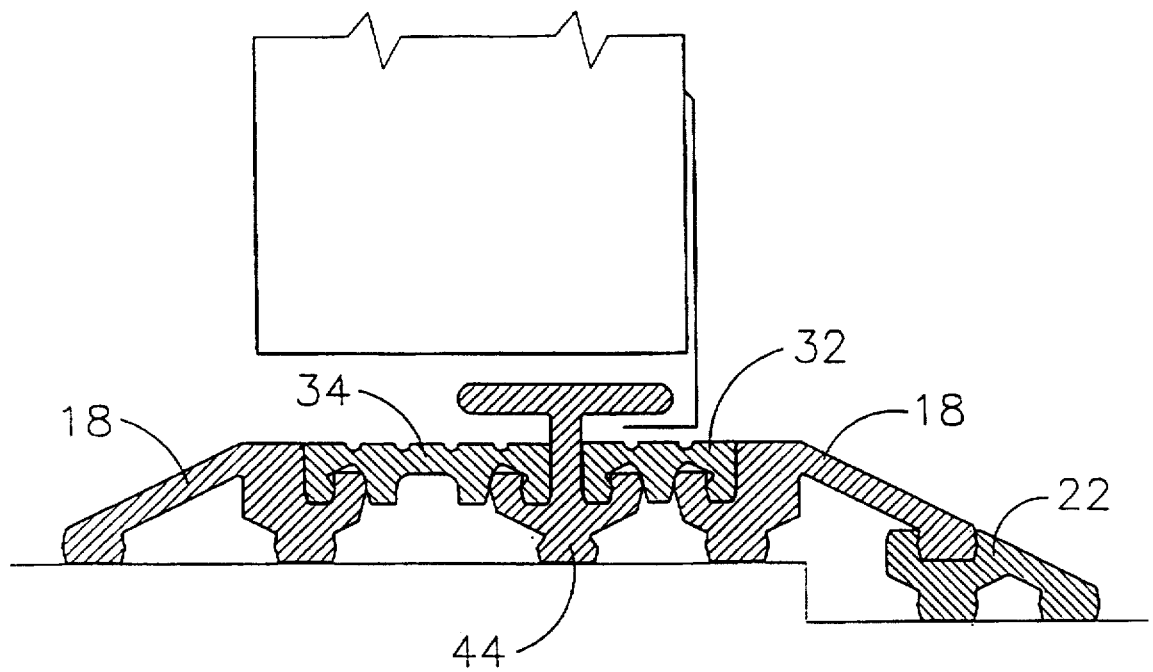
FIG. 2 is a cross section of an assembled offset threshold with a weather riser.
Figure 1:
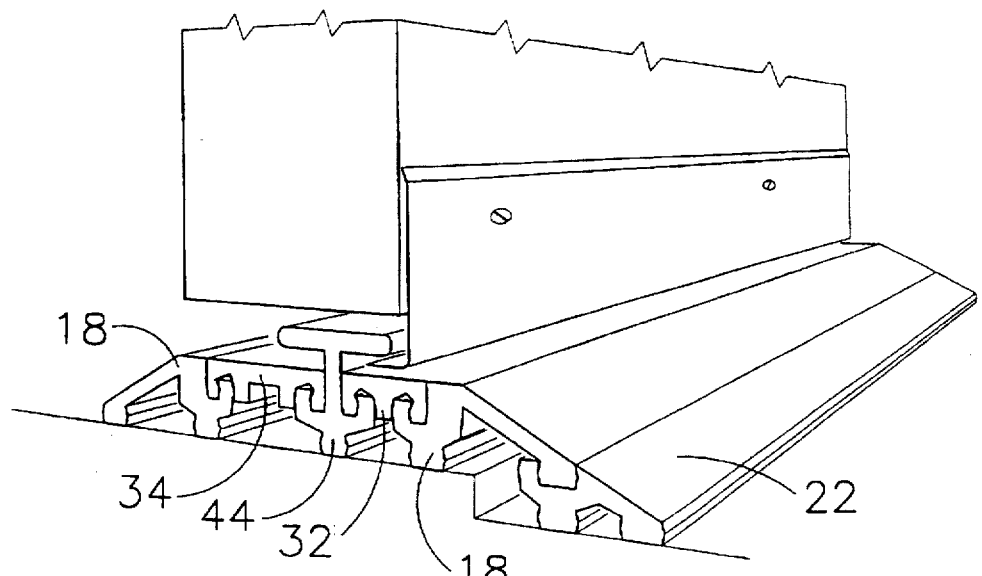
FIG. 1 is a perspective view of an assembled offset threshold with a weather riser.
Figure 2A:
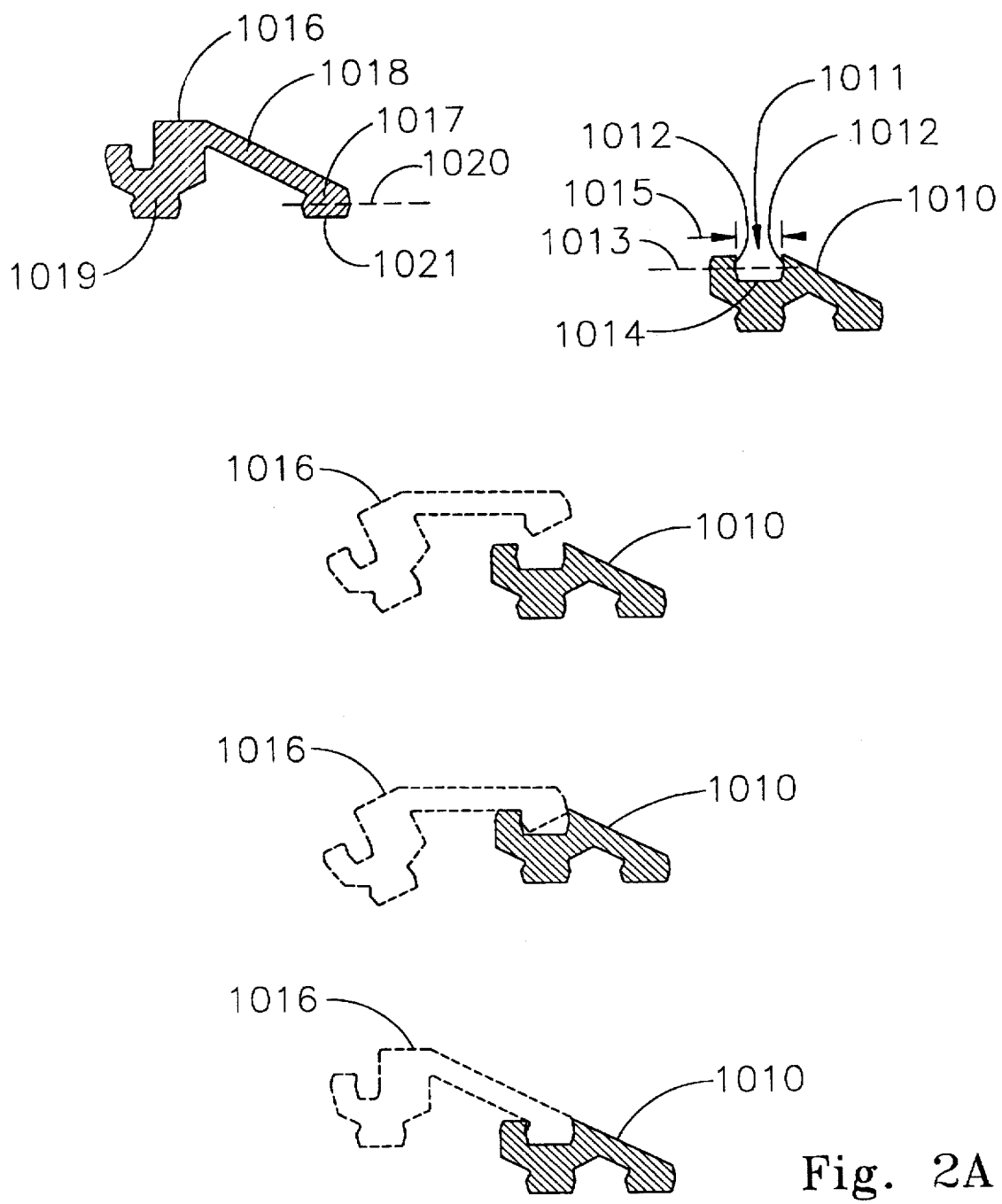

Referring first to FIGS. 1 and 2, it can be seen that one of the many thresholds that can be assembled from the present invention is an offset threshold with a weather riser 44. This configuration utilizes six of the components of the present invention to easily achieve what could under normal circumstances be a difficult threshold installation.

From right to left (outside to inside), the components used in this installation are a first one of a seventh toe 22, a fifth toe 18, a first plate 32, a weather riser 44, a second plate 34, and a second one of the fifth toe 18.

Each of the components of the threshold are locked together by means of a horizontal top joint 101 (depicted in detail in FIGS. 3A–E) or an offset joint 102 (depicted in detail in FIGS. 5A–E). A horizontal top joint 101 is formed when a component such as the seventh toe 22 receives on its upper surface a second component such as the fifth toe 18. An offset joint is 102 formed when a component such as the fifth toe 18 is joined with a component such as the first plate 32.

Referring now to FIGS. 3A–E, it can be seen that a first component 1010, in this case the seventh toe 22, of a horizontal top joint 101 includes in an upper surface thereof a receiving channel 1011. The receiving channel 1011 includes two side walls 1012. The side walls 1012 each have a profile that, from the upper surface, first increases in cross sectional area to a midline 1013, then decreases in cross sectional area until a bottom 1014 of the channel 1015 has the same width as an opening 1015 of the receiving channel 1011.

A second component 1016, in this case the fifth toe 18, of the horizontal top joint 101 includes a projecting rib 1017 whose profile matches that of the receiving channel 1011. The projecting rib 1017, from its attachment point 1018 to a main body 1019 of the fifth toe 18, first increases in cross sectional area to a midline 1020, then decreases in cross sectional area until a bottom 1021 of the rib 1017 has the same width as the attachment point 1018.

The unique profiles of the channel 1011 and the rib 1017 are critical to the present invention. The profile allows the second component to be rotated so that the projecting rib 1017 can be inserted into the channel 1011. When the second component is then rotated back to a horizontal orientation, the two components lock firmly together at the horizontal top joint 101. This ensures a snug fit while minimizing the crack between the two components.

Figure 4:
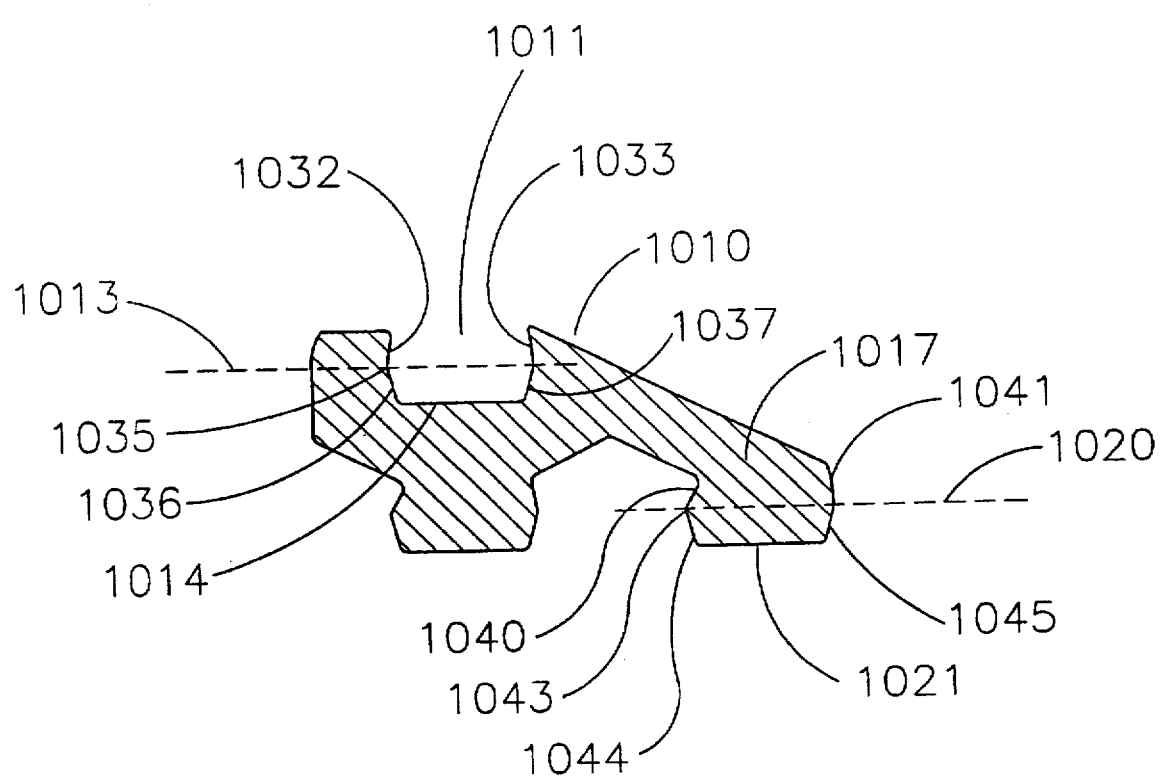
FIG. 4 is a detail cross section of the first component of the horizontal top joint.
Figure 5A:
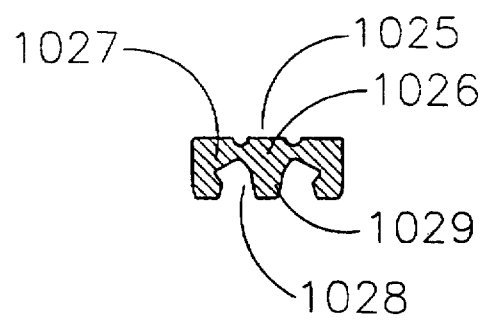
FIGS. 5A–E depict the assembly of an offset joint.
Figure 5B:
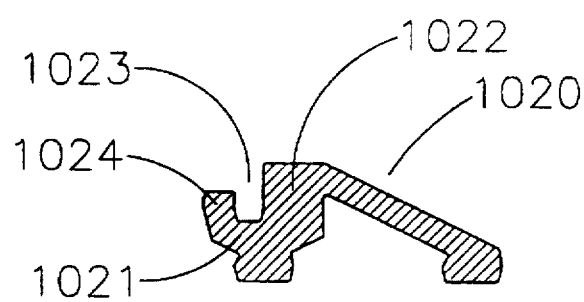
Figure 5C:
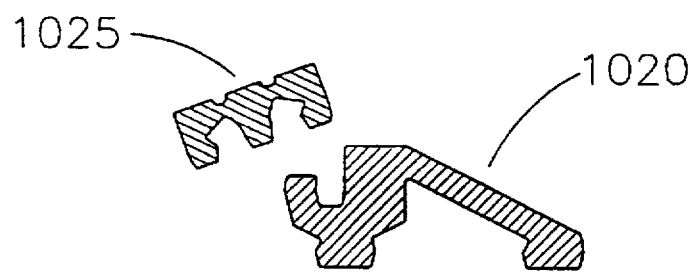
Figure 5D:
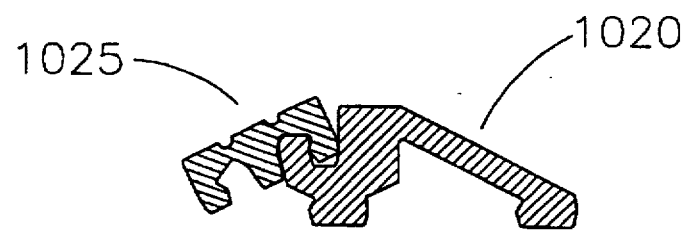
Figure 5E:
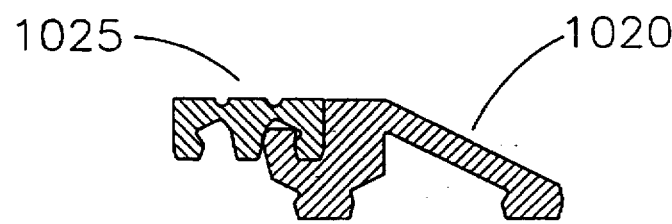
Figure 7:
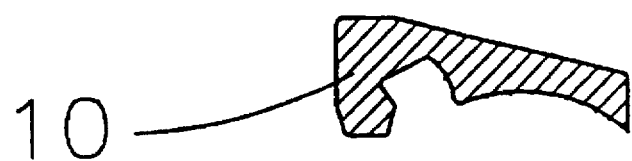
FIG. 7 is a cross section of a first toe.
Figure 6:
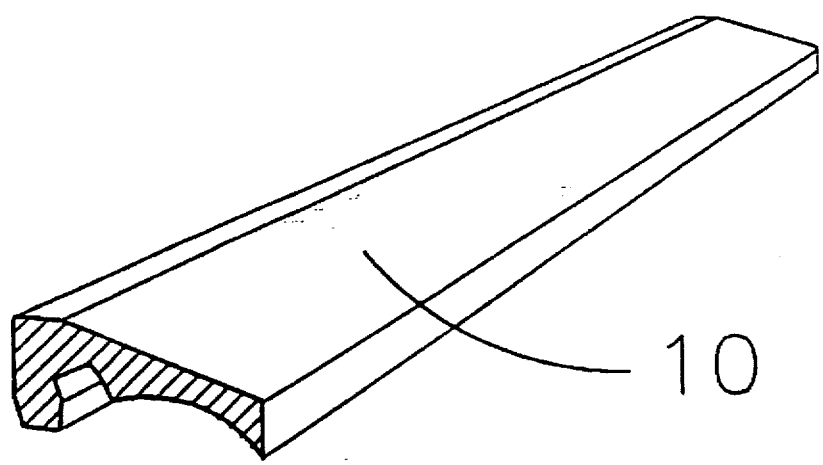
FIG. 6 is a perspective view of a first toe.
Figure 9:
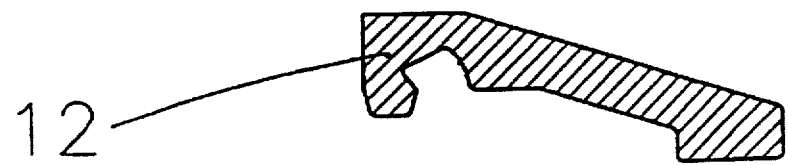
FIG. 9 is a cross section of a second toe.
Figure 8:
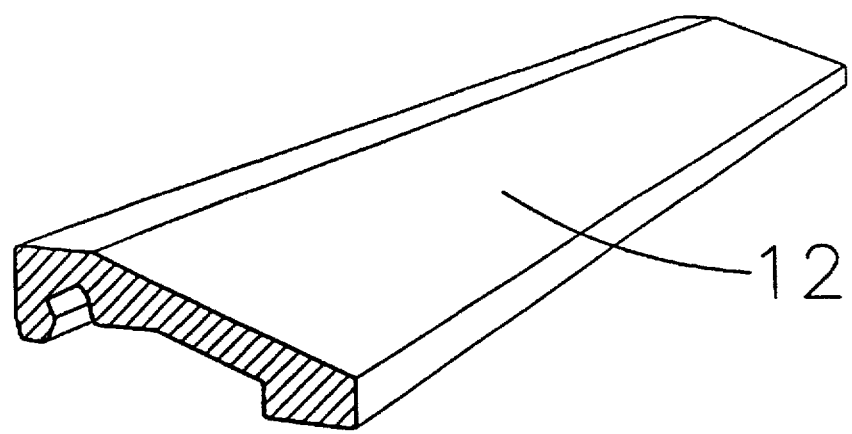
FIG. 8 is a perspective view of a second toe.
Figure 11:
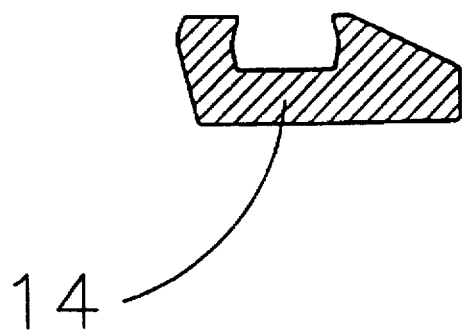
FIG. 11 is a cross section of a third toe.
Figure 10:
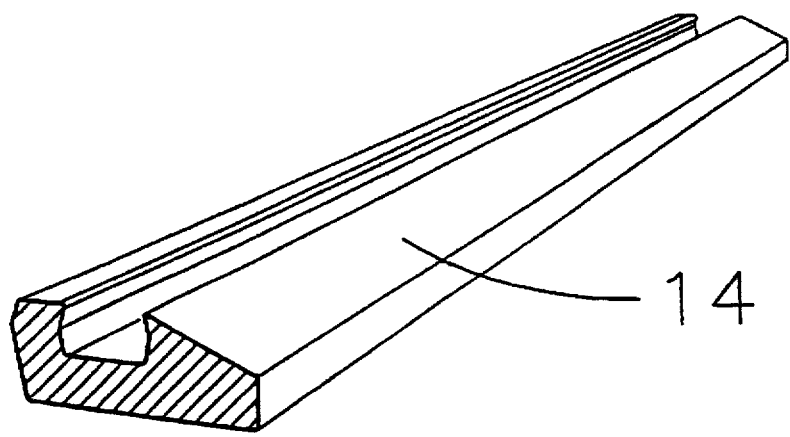
FIG. 10 is a perspective view of a third toe.
Figure 13:
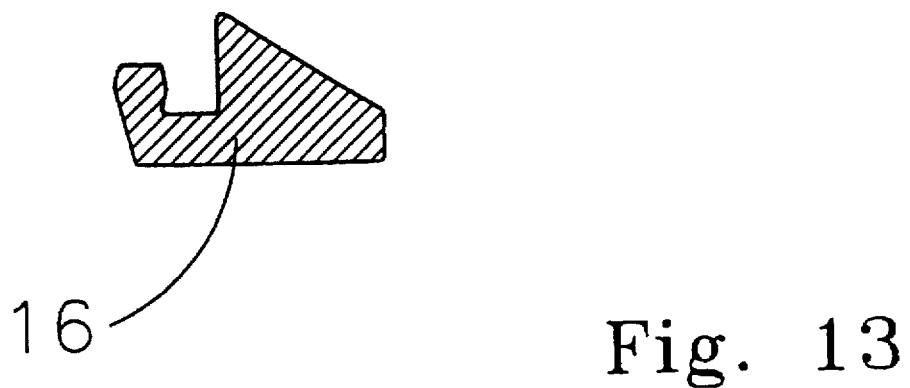
FIG. 13 is a cross section of a fourth toe.
Figure 12:
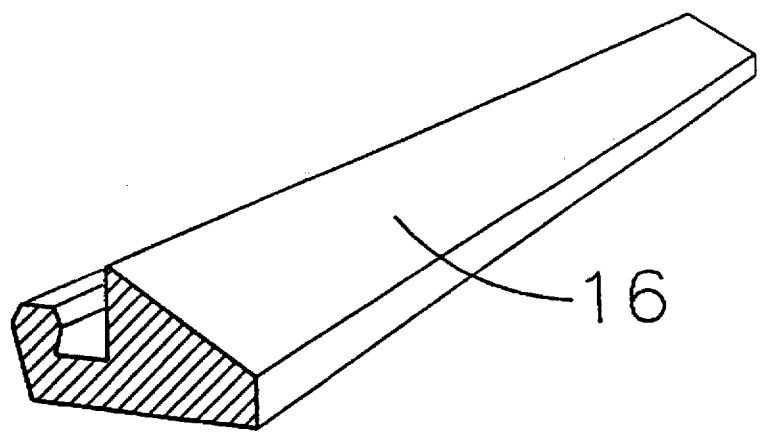
FIG. 12 is a perspective view of a fourth toe.
Figure 15:
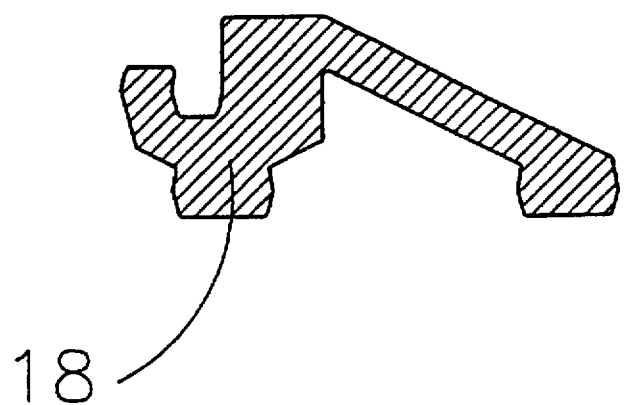
FIG. 15 is a cross section of a fifth toe.
Figure 14:
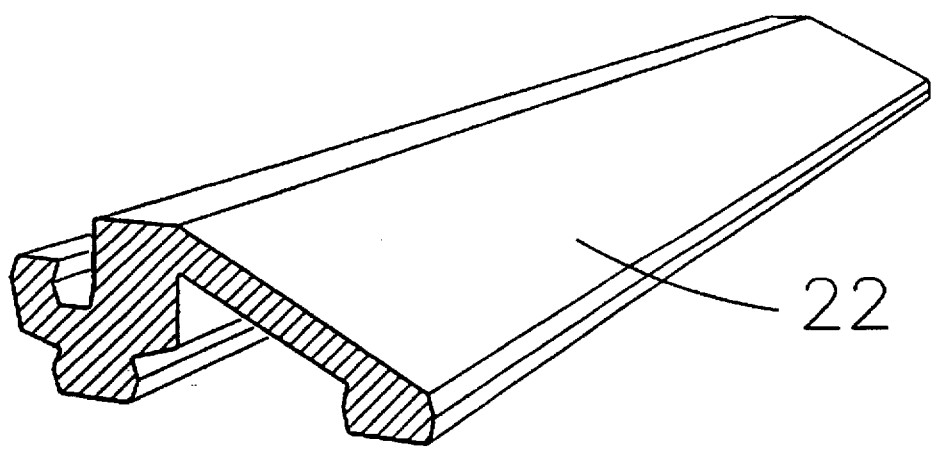
FIG. 14 is a perspective view of a fifth toe.
Figure 17:
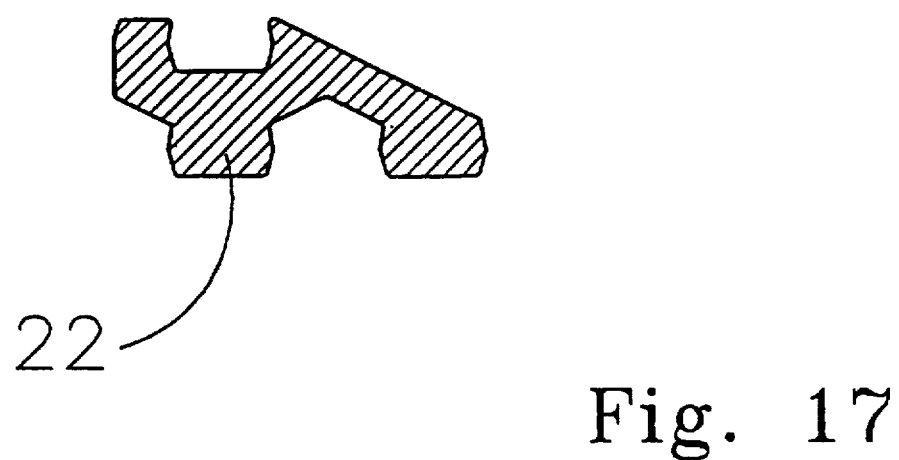
FIG. 17 is a cross section of a sixth toe.
Figure 16:
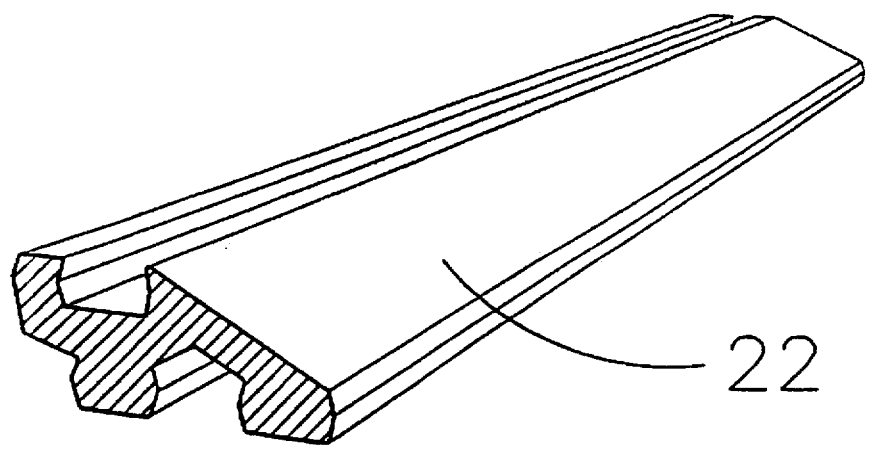
FIG. 16 is a perspective view of a sixth toe.
Figure 19:
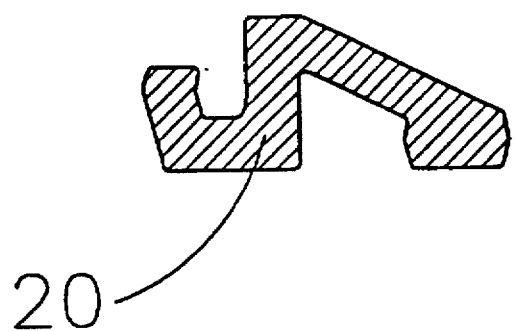
FIG. 19 is a cross section of a seventh toe.
Figure 18:
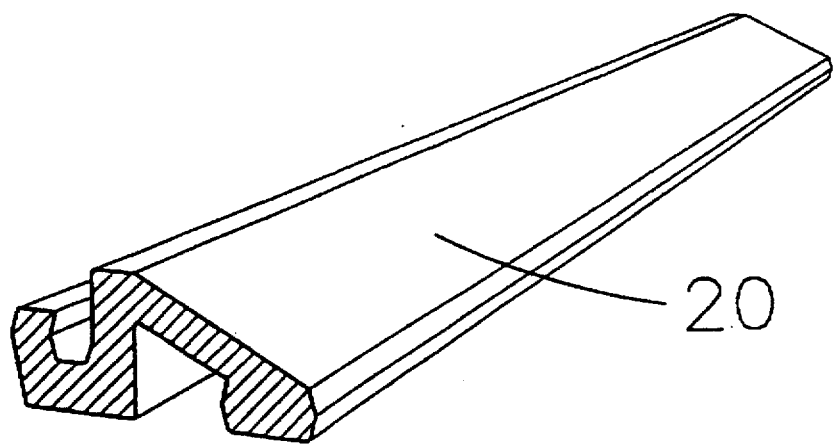
FIG. 18 is a perspective view of a seventh toe.
Figure 21:
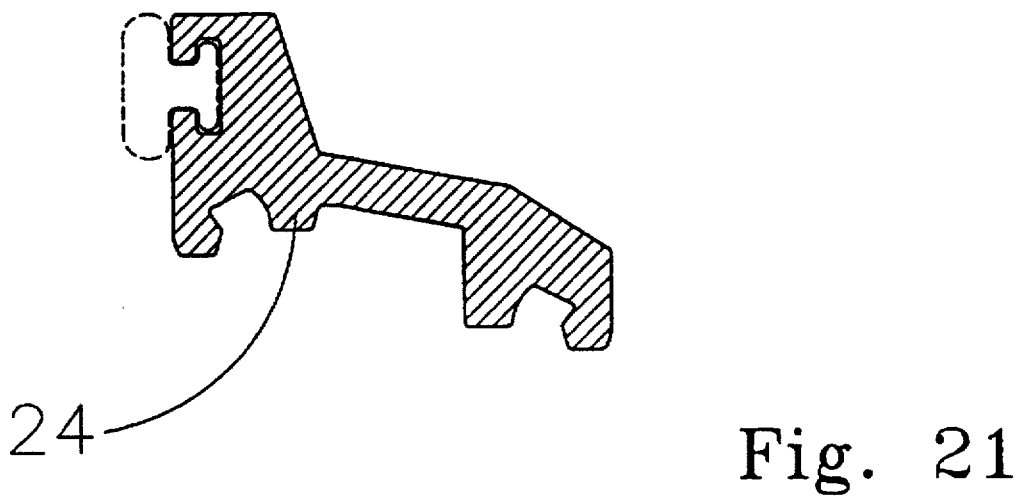
FIG. 21 is a cross section of an eighth toe.
Figure 20:
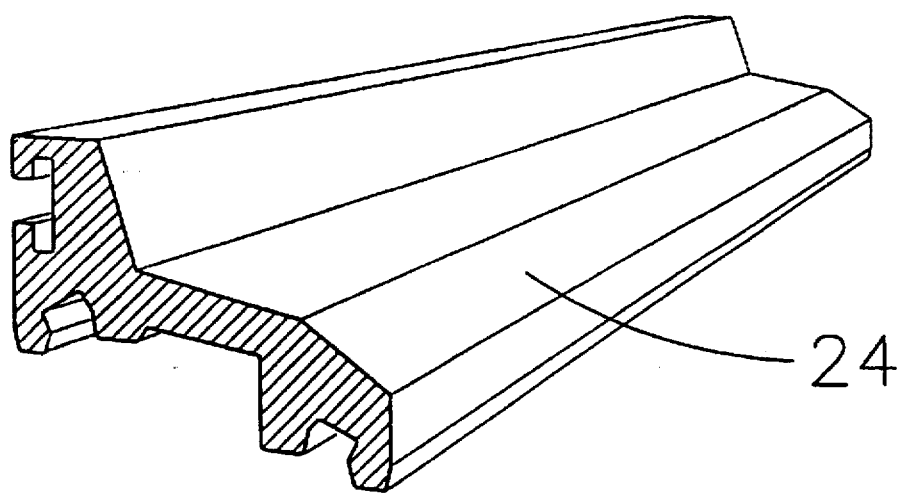
FIG. 20 is a perspective view of an eighth toe.

FIG. 4 gives a detail view of those unique profiles of the first component 1010 (the seventh toe 22). From FIG. 4 it can be seen that an upper radial side wall 1033 of the receiving channel 1031 and an upper radial face 1041 of the projecting rib 1017 are formed with a radius of curvature. This provides the latitude necessary to "roll" the components together. In addition, the curved faces allow the user to make radial adjustments of the toe piece of up to about 20°.

Beneath the midline 1034 of the receiving channel 1031 are two lower angled sidewalls 1036 and 1037. Forming an angle with the first lower angled sidewall 1036 at a midpoint 1035 is an upper angled sidewall 1032. Similarly on the projecting rib 1039, there are two lower angled faces 1044 and 1045. Above the center point 1043 is an upper angled face 1040.

It should also be noted that if the user so desires, lower angled sidewall 1037 and lower angled face 1045 may also have a radius of curvature.

Similarly, an offset joint 102 is formed as illustrated in FIGS. 5A–E. A first component 1020, in this case the fifth toe 18, of the offset joint 102 includes an upwardly projecting flange 1021. The flange 1021 extends laterally away from a main body 1022 of the first component 1020, and then upward to form a receiving channel 1023. The distal end of the flange 1021 is angled inward so that a protruding lip 1024 is formed.

A second component 1025, in this case a first plate 32, includes a downwardly extending flange 1026. The flange 1026 extends laterally from a main body 1027, then downward to form a receiving channel 1028 in the second component 1025. An inner side of the distal end of the flange 1026 is angled to form a protruding edge 1029.

The joint 102 is assembled as shown in FIGS. 5A–E. The second component 1025 is rotated downward to allow the insertion of the flange 1026 of the second component 1025 into the receiving channel 1023 of the first component 1020. The second component 1025 is then rotated to a horizontal position, with the protruding edge 1029 of the second component abutting the lip 1024 of the first component. This assures a secure joining of the two components.

Other components included in the threshold system are illustrated in FIGS. 6–41. FIGS. 6–21 illustrate respectively perspective and cross sectional views of a first toe 10, a second toe 12, a third toe 14, a fourth toe 16, a fifth toe 18, a sixth toe 20, a seventh toe 22, and an eighth toe 24.

Figure 23:
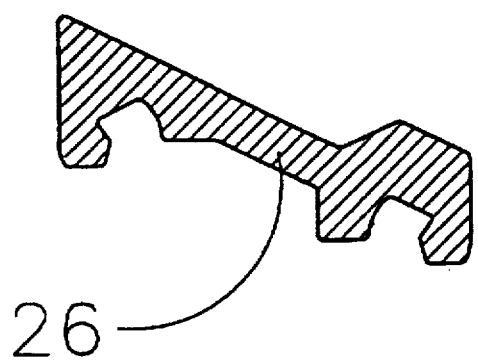
FIG. 23 is a cross section of a panic exit toe.
Figure 22:
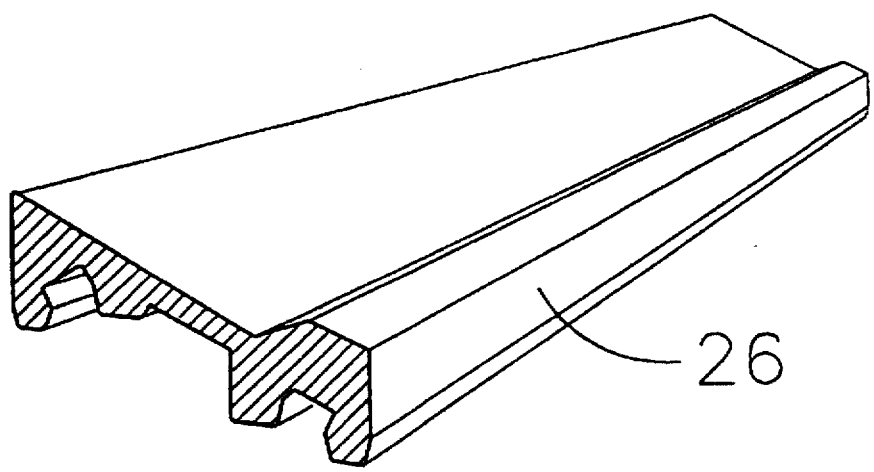
FIG. 22 is a perspective view of a panic exit toe.
Figure 25:
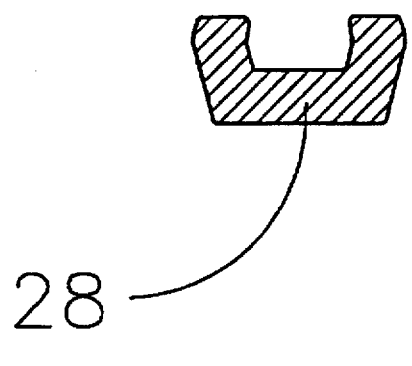
FIG. 25 is a cross section of a first riser.
Figure 24:
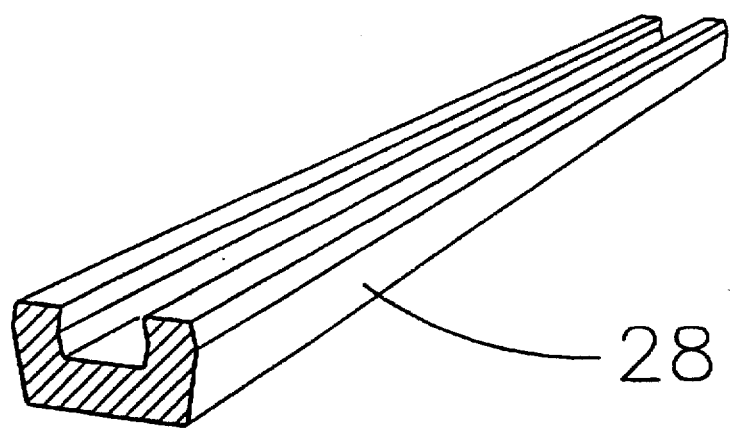
FIG. 24 is a perspective view of a first riser.
Figure 27:
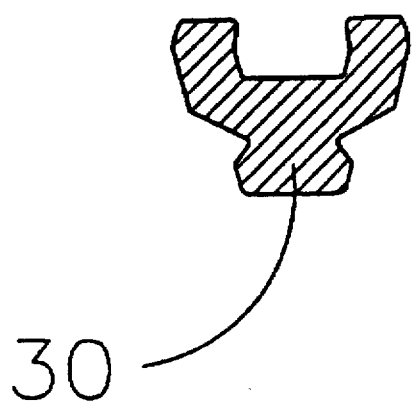
FIG. 27 is a cross section of a second riser.
Figure 26:
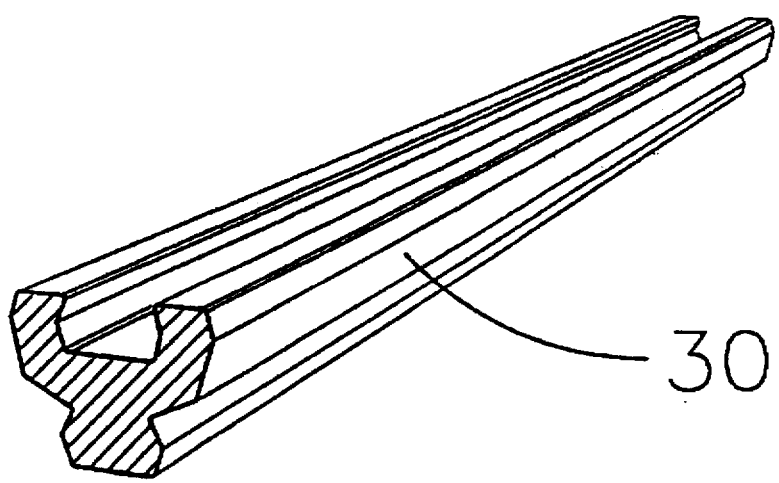
FIG. 26 is a perspective view of a second riser.
Figure 29:
FIG. 29 is a cross section of a first plate.
Figure 28:
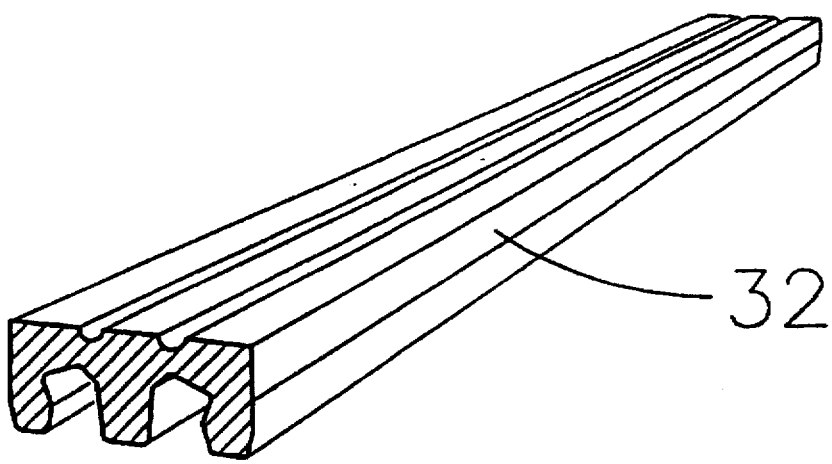
FIG. 28 is a perspective view of a first plate.
Figure 31:
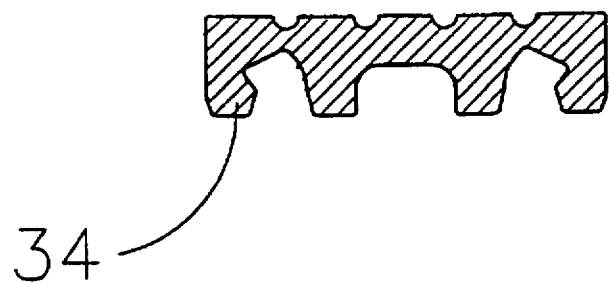
FIG. 31 is a cross section of a second plate.
Figure 30:
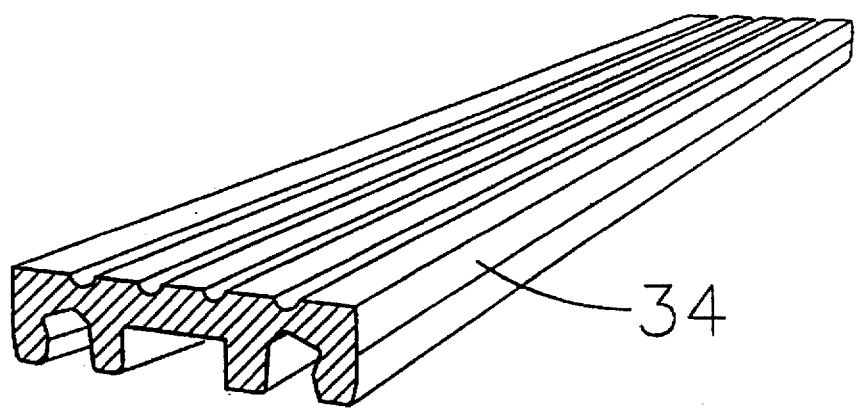
FIG. 30 is a perspective view of a second plate.
Figure 33:
FIG. 33 is a cross section of a third plate.
Figure 32:
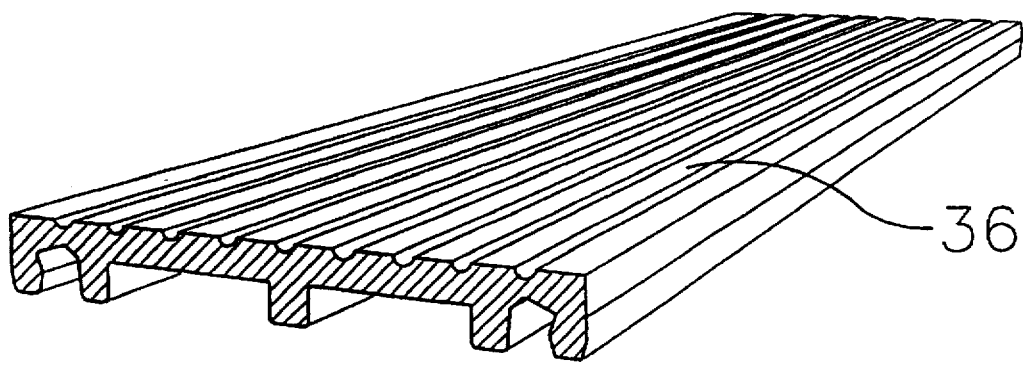
FIG. 32 is a perspective view of a third plate.

FIGS. 22 and 23 show a perspective view and cross section of a panic exit toe 26.

FIGS. 24–27 show respectively perspective views and cross sections of a first riser 28 and a second riser 30.

FIGS. 28–33 illustrate respectively perspective and cross sectional views of a first plate 32, a second plate 34, and a third plate 36.

Figure 35:
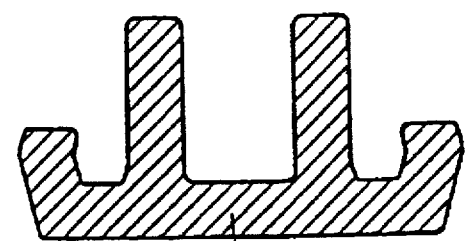
FIG. 35 is a cross section of a sliding door track.
Figure 34:
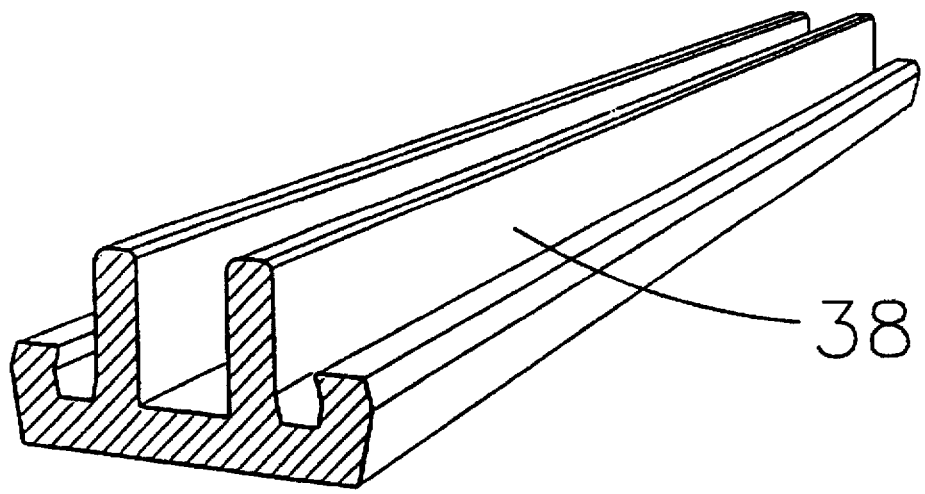
FIG. 34 is a perspective view of a sliding door track.

FIGS. 34 and 35 illustrate a perspective view and a cross section of a sliding door track 38.

Figure 37:
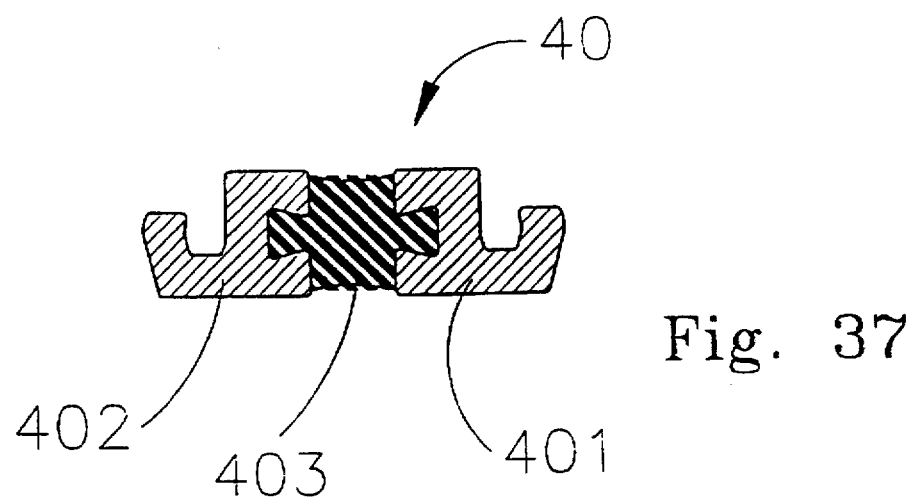
FIG. 37 is a cross section of a thermal break.
Figure 36:
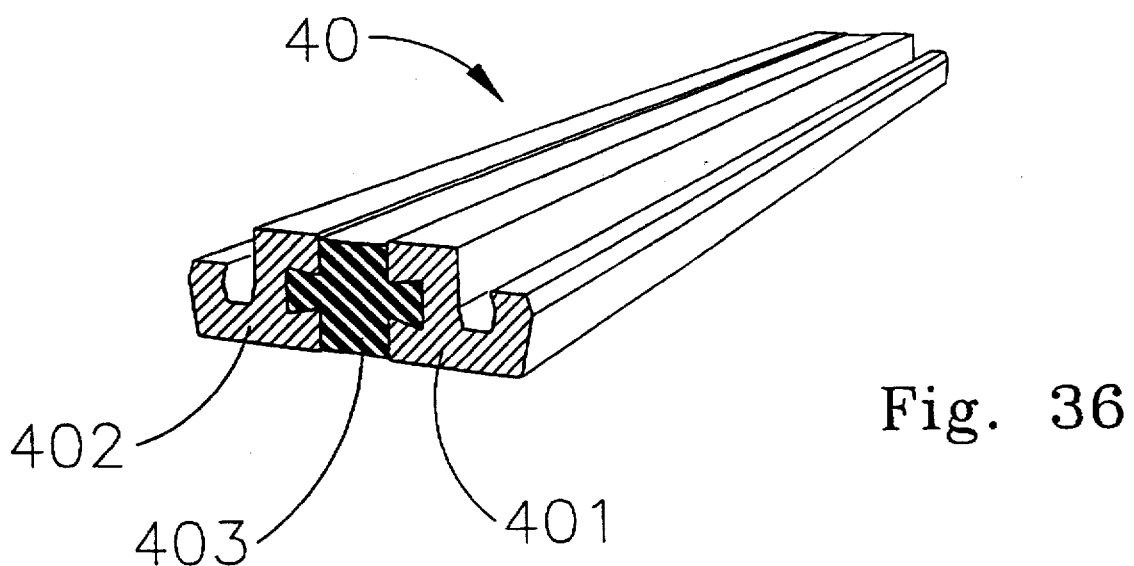
FIG. 36 is a perspective view of a thermal break.

FIGS. 36 and 37 show a perspective view and a cross sectional view of a thermal break 40.

Figure 39:
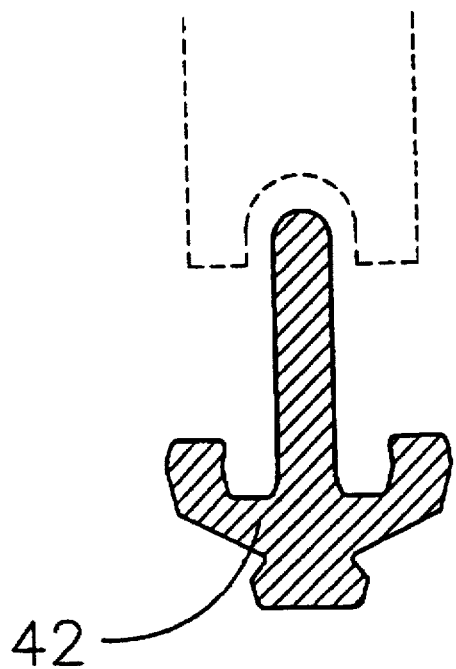
FIG. 39 is a cross section of a rolling door track.
Figure 38:
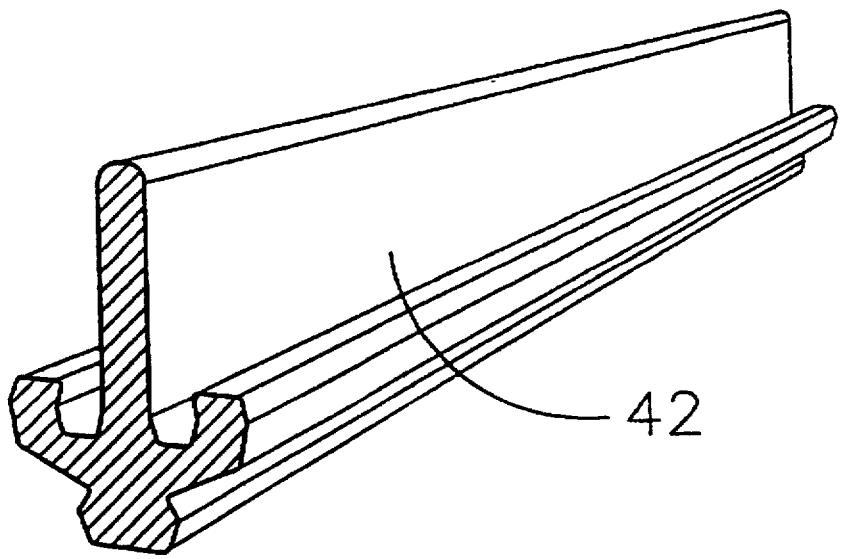
FIG. 38 is a perspective view of a rolling door track.

FIGS. 38 and 39 depict a perspective view and a cross sectional view of a rolling door track 42.

Figure 41:
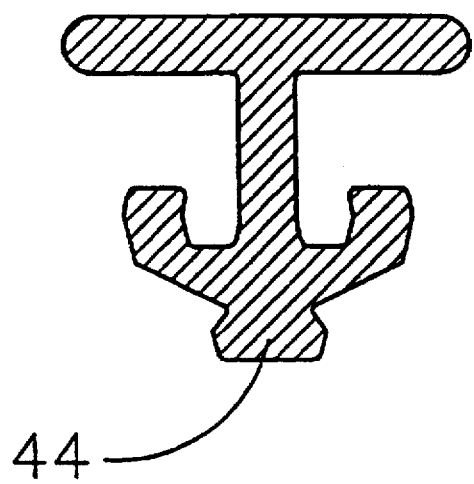
FIG. 41 is a cross section of a weather riser.
Figure 40:
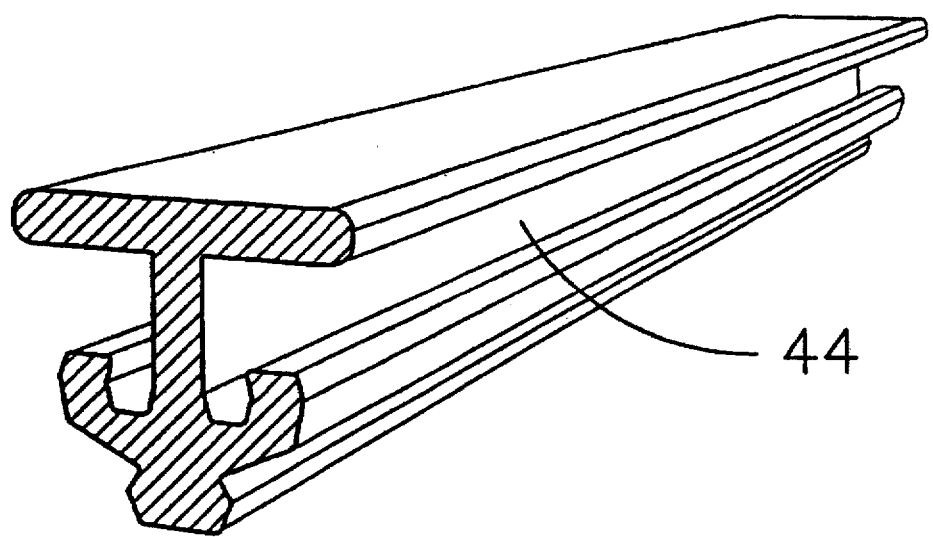
FIG. 40 is a perspective view of a weather riser.

FIGS. 40 and 41 show a perspective view and a cross sectional view of a weather riser 44.

The above disclosure is not intended as limiting. Those skilled in the art will readily observe that numerous modifications and alterations of the device may be made while retaining the teachings of the invention. Accordingly, the above disclosure should be construed as limited only by the metes and bounds of the appended claims.

I claim:

1. A modular threshold comprising:

at least three components, a first toe, a second toe, and a third component chosen from the group including risers, plates, thermal breaks, sliding door tracks, and rolling door tracks; wherein each said component includes at least one flange, projecting rib, or receiving channel, so that said flange or said projecting rib is placed into a receiving channel to lock said at least three components firmly together, and said receiving channel includes two side walls, each said side wall comprising an upper side wall and a lower side wall, such that said receiving channel has a profile that, from an opening of said receiving channel, first increases in cross sectional area to a midline, then decreases in cross sectional area until a bottom planar surface of the channel has the same width as said opening of said receiving channel, said projecting rib having a profile which corresponds to that of said receiving channel; such that said projecting rib is received in said receiving channel, thereby locking said a least three components firmly together.

* * * * *

UNITED STATES PATENT AND TRADEMARK OFFICE
CERTIFICATE OF CORRECTION

PATENT NO. : 5,673,517
DATED : October 7, 1997
INVENTOR(S) : James R. Stanclift

It is certified that error appears in the above-identified patent and that said Letters Patent is hereby corrected as shown below:

At column 6, line 9, replace "a" with --at--.

Signed and Sealed this

Ninth Day of December, 1997

Attest:

BRUCE LEHMAN

Attesting Officer

Commissioner of Patents and Trademarks